INVENTOR
LLOYD H. JOICHI

BY *Olsen and Stephenson*
ATTORNEYS

INVENTOR
LLOYD H. JOICHI

BY *Olsen and Stephenson*
ATTORNEYS

United States Patent Office 3,447,658
Patented June 3, 1969

3,447,658
MACHINE TOOL APPARATUS
Lloyd H. Joichi, Warren, Mich., assignor to La Salle Machine Tool, Inc., Warren, Mich., a corporation of Michigan
Filed May 31, 1966, Ser. No. 554,152
Int. Cl. B23q 7/00; B65g 47/52, 49/00
U.S. Cl. 198—19
2 Claims

ABSTRACT OF THE DISCLOSURE

Apparatus for advancing a workpiece through a plurality of successive stations arranged in a plurality of spaced vertically extending lines comprising vertically movable transfer bars for moving a plurality of workpieces in each of the lines vertically to successive stations so that the workpieces in adjacent lines move in opposite directions, means for subsequently moving the workpieces at the tops of the lines which have been moved upwardly and the bottoms of the lines which have been moved downwardly in one direction substantially horizontally to a position in the next successive line, means for holding moved workpieces in fixed positions at some of the stations, and machine tools for performing a particular machine operation on the workpieces in some of the stations in which workpieces are held in fixed positions.

---

This invention relates generally to multi-station machine tool apparatus in which a plurality of workpieces are transferred through successive work stations, and more particularly to improved apparatus of this type in which the work stations are arranged in vertically extending side-by-side lines so as to occupy a minimum of plant floor space.

In one embodiment of the apparatus of this invention, it is capable of drilling a deep hole in an engine head. The hole is drilled by making twelve successive drill passes into the workpiece from opposite ends of the workpiece. During each pass, a portion of the deep hole is drilled. Heretofore, the design of this type of machine tool apparatus involved complicated machinery arranged in a substantially horizontal line for successively moving the workpieces through the stations. Such machinery is not only expensive but also consumes valuable plant floor space. It is an object of this invention, therefore, to provide improved machine tool apparatus capable of performing operations of the above-described type in which the work stations are arranged in vertically extending lines to thereby avoid a requirement for considerable plant floor space.

Further objects of the present invention are to provide machine tool apparatus of the character described which is of simple design, requires a minimum of maintenance, involves a minimum number of components, is relatively inexpensive in cost, utilizes gearless heads, and provides for an operation of the machine tools, such as drills, at relatively slow speeds so as to prolong the life of the tools and thereby reduce the tooling cost.

In the machine tool apparatus of this invention, the machine tools are arranged in horizontally spaced banks on opposite sides of the path of travel through which a large number of workpieces are successively indexed or transferred through a plurality of stations which are arranged in vertical side-by-side lines. Some of the stations are work stations, namely, stations at which work is performed on the workpiece. Others of the stations are dwell stations, namely, stations at which no work is performed on the workpieces, so that defective workpieces can be detected and removed before unnecessary work is performed thereon. Still others of the stations are for load and unload. Each workpiece travels up one line of stations, down the next line, up the succeeding, and so forth, until the work at each work station has added up to the total work desired to be done on the workpiece. The tools in each bank are arranged relative to each other and mounted on a common body so that the entire bank can be advanced and retracted relative to the workpieces so as to perform the necessary successive work operations thereon. In other words, the drills in each line of stations are of staggered effective lengths so that each removes the same amount of material from the workpiece, with each tool beginning its drilling operation where the preceding tool stopped. Because the tools are arranged in banks which are spaced horizontally and located on opposite sides of the workpieces, the desirable load and unload areas and service and access areas from which the machine tool apparatus and the workpieces can be serviced during operation, are automatically obtained.

Further objects, features and advantages of this invention will become apparent from a consideration of the following description, the appended claims, and the accompanying drawing in which:

Figure 1:
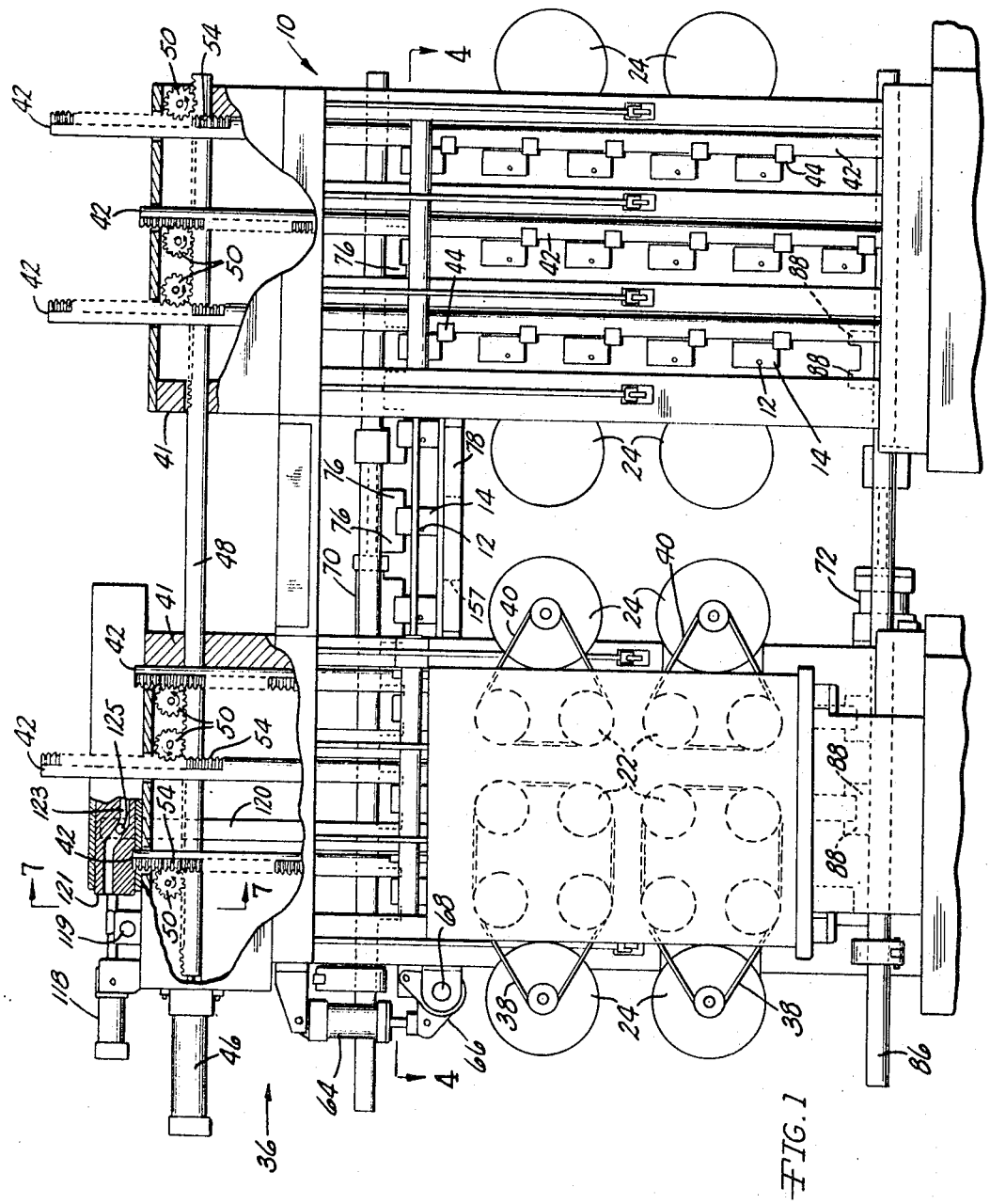
FIGURE 1 is a side elevational view of the machine tool apparatus of this invention with some parts broken away for the purpose of clarity.
Figure 2:
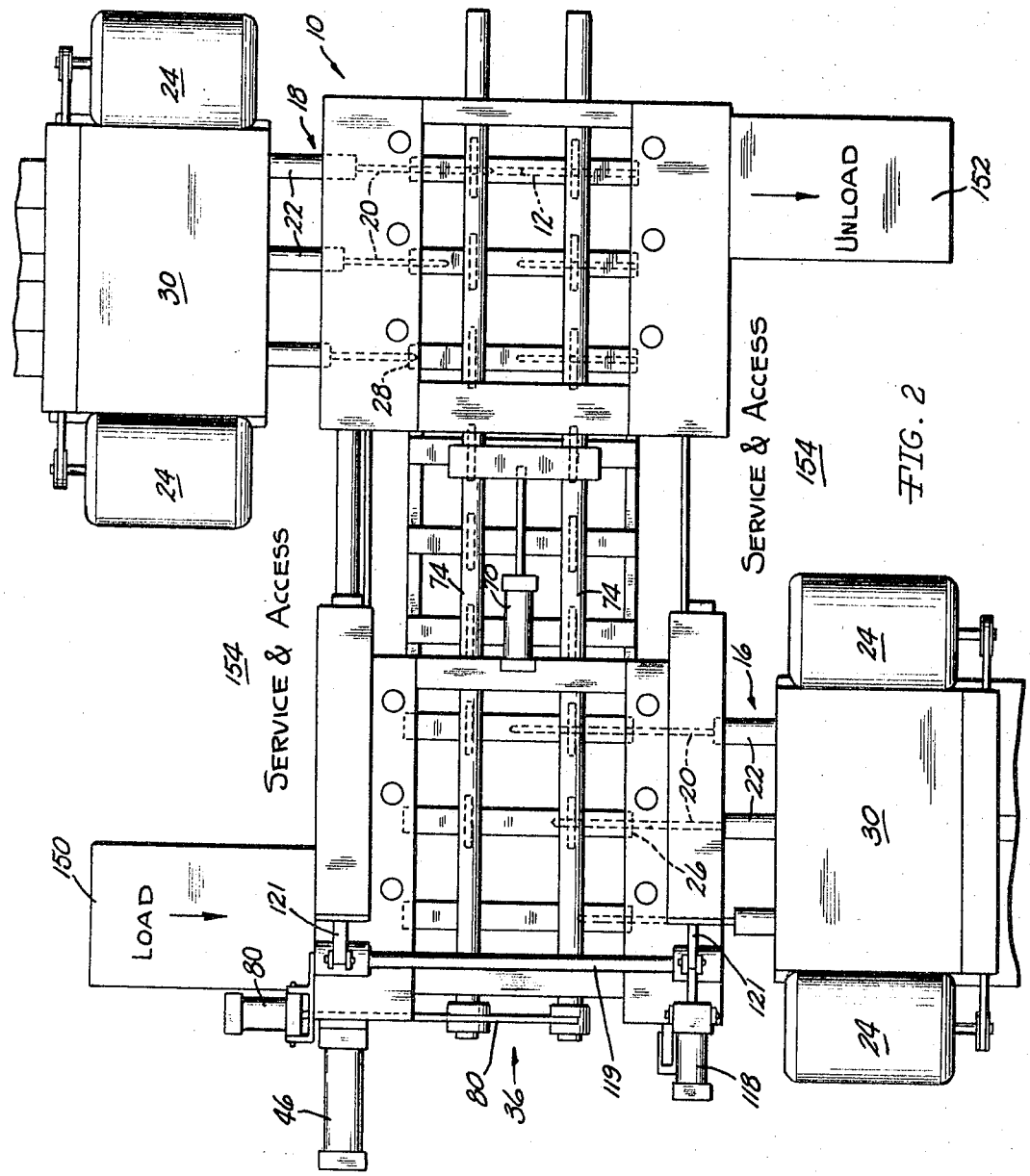
FIGURE 2 is a top view of the machine tool apparatus of this invention with some parts broken away and other parts shown in section for the purpose of clarity.
Figure 3:
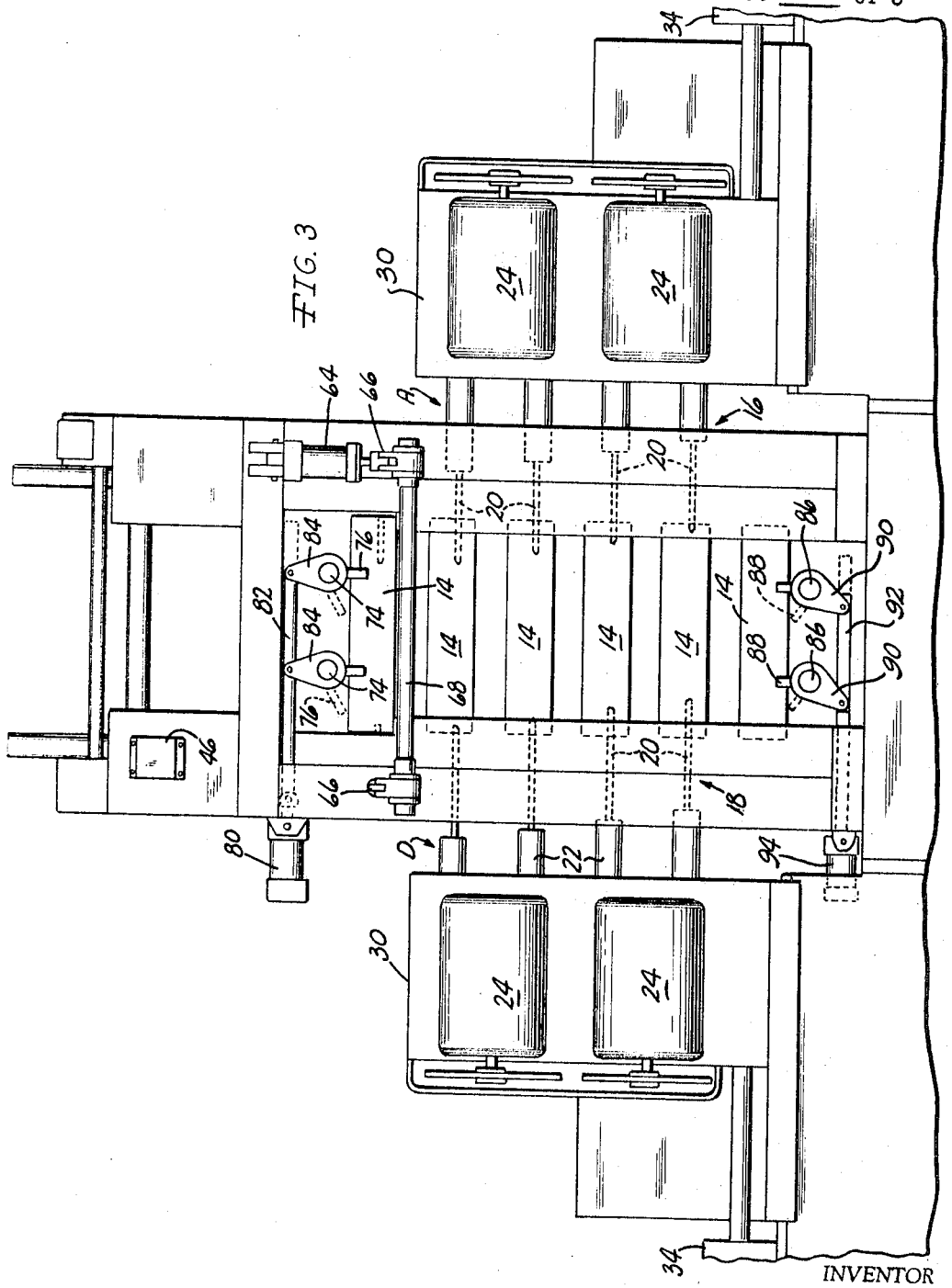
FIGURE 3 is an end view of the machine tool apparatus of this invention.

With reference to the drawing, the machine tool apparatus of this invention, indicated generally at 10, is illustrated in a form capable of drilling an elongated hole 12 (FIG. 2) through a workpiece 14. As shown in FIGS. 1, 2 and 3, the apparatus 10 consists of two banks 16 and 18 of drills 20 mounted in rotatable spindles 22 driven by motors 24. The banks 16 and 18 are spaced apart in a horizontal direction and are arranged on transversely opposite sides of the workpieces 14 as they are moved through the apparatus 10. As a result, the drills 20 in the bank 16 operate to drill part of the hole 12 from the end 26 of each workpiece 14, and the drills 20 in the bank 18 operate to drill the remainder of the hole 12 from the opposite end 28. The drills 20, spindles 22, and motors 24 in each of the banks 16 and 18 are mounted on a body 30 which is movable horizontally on a supporting base 32 toward and away from the workpieces 14. A cylinder assembly 34 is illustrated for moving each of the bodies 30.

A workpiece support and transfer assembly, indicated generally at 36 in FIG. 2, is provided for moving workpieces 14 up and down through successive stations in the apparatus 10 and from left to right as viewed in FIG. 2 so that the workpieces are first subjected to the action of the drills 20 in the bank 16 and then to the action of the drills 20 in the bank 18. The assembly 36, which is described in detail hereinafter, operates to fix the workpieces at the stations during drilling and operates in-between successive advances of the drills 20 to move a workpiece through approximately thirty-nine stations, shown in FIGS. 8–10, inclusive. At all times, approximately thirty-three workpieces 14 are being moved through the apparatus 10, there being one workpiece at all but six of the stations, and the transfer assembly 36 moves the workpieces so that following each operation of the drills 20, a workpiece 14 with a completed hole 12 therein can be removed from the the unload station in the apparatus 10.

Figure 8:
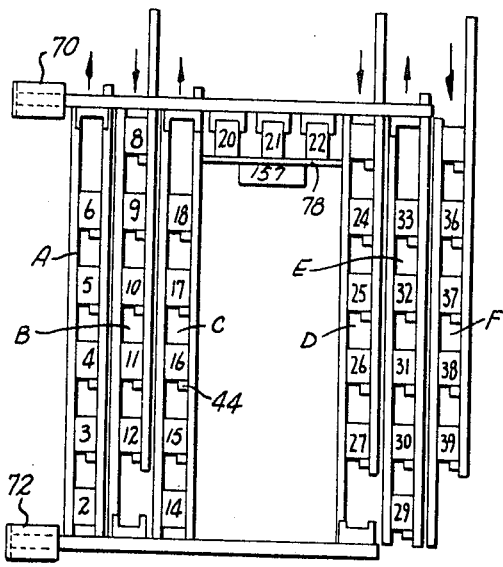
FIGURES 8, 9 and 10 are diagrammatic views illustrating the sequence of operation of the machine tool apparatus of this invention.
Figure 9:
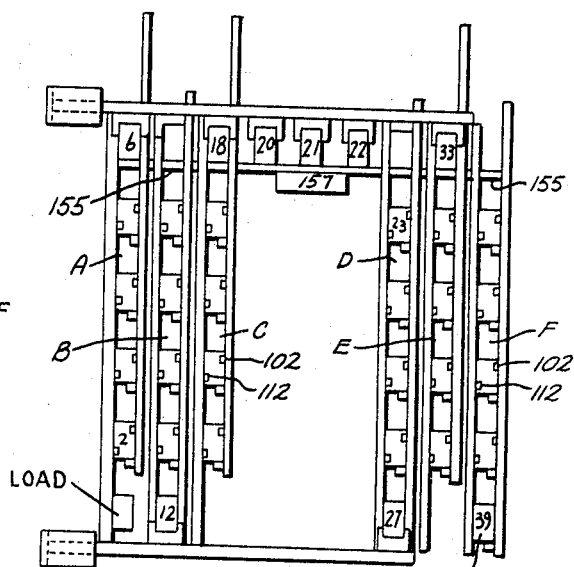
Figure 10:
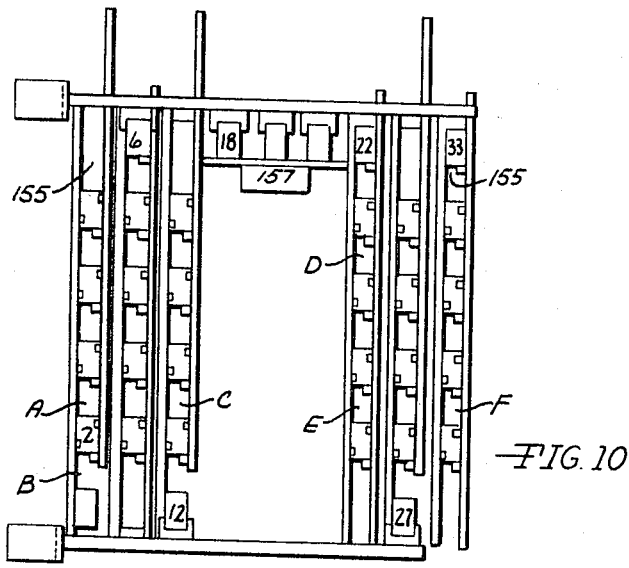

In FIGS. 8, 9 and 10, the workpieces in the apparatus 10 at a given time are numbered, substantially consecutively, there being gaps in the consecutive numbering where there is a station at which no workpiece is located, for the purpose of indicating the approximate number of stations in the apparatus 10. As shown in FIGS. 8, 9 and 10, the stations in the apparatus 10 are arranged in six vertically extending lines A through F, inclusive, with a substantial space between the lines C and D. Workpieces in the lines A, B, and C are subjected to the action of the drills 20 in the bank 16, and workpieces in the lines D, E, and F are subjected to the action of the drills 20 in the bank 18.

The workpiece transfer assembly 36 operates to move the workpieces in each of the lines A–F, inclusive vertically. The workpieces in lines A, C and E are moved upwardly, and the workpieces in the lines B, D and F are moved downwardly. The workpiece transfer assembly 36 is also capable of moving the workpieces at the top and bottom ends of the lines A–E horizontally so as to move the workpiece at the top or bottom of a line into the next line. As a result, the assembly 36 is capable of moving a workpiece successively through the thirty-nine stations. In FIG. 8 the workpiece numbered 2 is located at the "load" station and in FIG. 9 the workpiece numbered 39 is shown at the "unload" station. By the time a workpiece has moved completely through the apparatus 10 from the load to the unload station, the hole 12 has been formed therein, and at some of the intermediate stations, the workpiece can be removed for checking and discarding if defective.

As shown in FIG. 3, the drills 20 in line A are arranged so that their working ends are staggered. As a result, each successive tool 20 in line A, moving in an upward direction, will drill the hole 12 deeper into the workpiece 14, with each of the drills removing substantially the same amount of metal from the workpiece 14 so that all drills can operate at the same speed. Conversely, the drills 20 in the line D have their working ends staggered so that, moving in a downward direction, each of the tools 20 extends further into the workpiece 14. The drills 20 are reversely arranged in the lines A and D because the workpieces 14 in the line A move upwardly, and the workpieces in the line D move downwardly. Consequently, the drills in the lines C and E are similarly arranged to the drills in the line A and the drills in the lines B and F are arranged like the drills in the line D. As shown in FIG. 1, the spindles 22 are arranged in groups by the drive belts 38 for the motors 24. Thus, in each bank, each of a pair of belts 38 drives four spindles 22 and each of a second pair of belts 40 drives a pair of spindles 22. This reduces the number of motors required to four in each bank and enables the use of gearless drive spindles 22.

Figure 7:
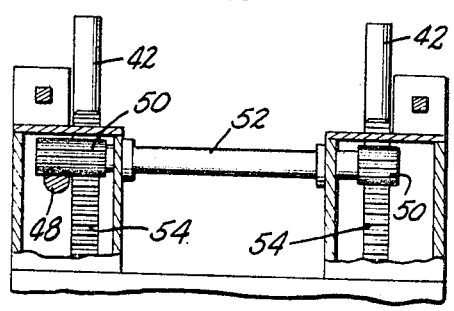
FIGURE 7 is a fragmentary transverse sectional view of a portion of the apparatus of this invention looking substantially along the line 7—7 in FIG. 1, and showing a portion of the vertical transfer unit in the apparatus.

The assembly 36 includes a plurality of vertically movable transfer bars 42 (FIG. 1), mounted on a main frame 41, the bars 42 being arranged in pairs spaced apart in a direction transversely of the apparatus 10. Each pair of bars 24 is provided with a plurality of workpiece support fingers 44 likewise arranged in aligned pairs, transversely of the apparatus 10, the fingers 44 being spaced apart vertically on the bars 42 corresponding to the distance between stations so that each pair of fingers 44 is positioned to support opposite ends of a workpiece 14 at a station. Consequently, on vertical movement of the transfer bars 42, the workpieces 14 are moved on the fingers 44 in vertical directions through successive stations. The bars 42 are moved vertically in response to operation of a fluid actuated cylinder assembly 46 which operates to reciprocate a rack 48 which extends horizontally of the apparatus 10 above the banks 16 and 18. The rack 48 meshes with gears 50, arranged in pairs and connected by tie bars 52, only one of which is shown in FIG. 7, so that on movement of the rack 48 to the right as viewed in FIG. 1, the gears 50 are rotated in directions such that they drive geared sections 54 of the transfer bars 42 in the desired vertical directions. In other words, the transfer bars 42 for the line A are moved upwardly, and the transfer bars 42 for the line B are moved downwardly, with the other transfer bars moving in the desired directions to move the workpieces through the remaining lines. Each of the transfer bars 42 is also rotatable about its axis so as to move the fingers 44 thereon to the broken line positions illustrated in FIG. 4 in which the fingers 44 are moved to positions spaced from the workpieces 14. In a rotated position of a transfer bar 42, the geared section 54 still meshes with the drive gear 50 so that rotation of gear 50 operates to drive the transfer bar. This enables the transfer bars 42 to be returned to their original positions after they have advanced workpieces thereon to the next successive work stations therefor.

Figure 4:
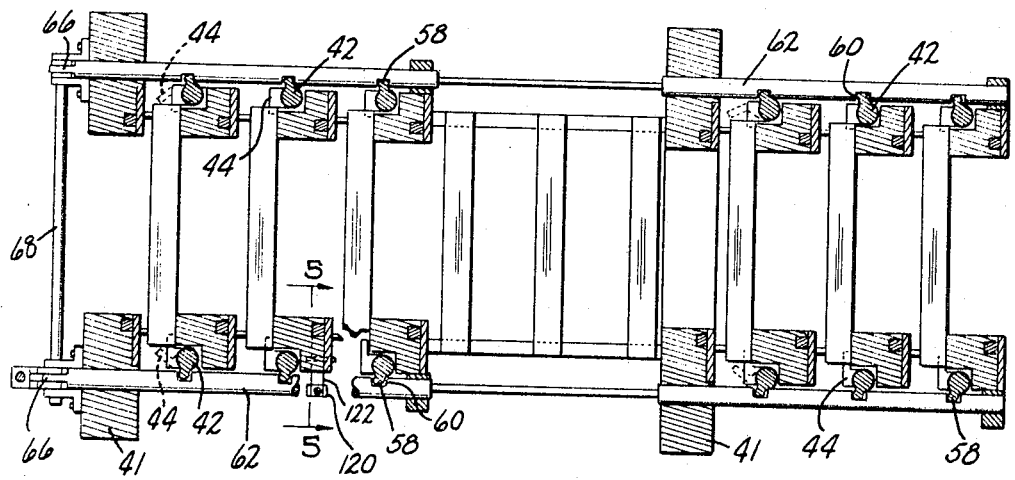
FIGURE 4 is a reduced horizontal sectional view of the machine tool apparatus of this invention as seen from substantially the line 4—4 in FIG. 1, with some parts being broken away for the purpose of clarity.

As shown in FIG. 4, each transfer bar 42 is provided with a transverse projection 58 positioned in a notch 60 in a horizontally reciprocable actuating bar 62. The bars 62 are movable on the machine main frame 41 by means of a cylinder assembly 64 pivotally connected to a bell crank 66 at the end of one of the bars 62. The crank 66 is secured to a tie bar 68, pivotally mounted on the frame 41 and secured to another bell crank 66 which moves a second actuating bar 62 on the opposite side of the machine. Thus, on operation of the cylinder assembly 64, the bars 62 are movable to the right as viewed in FIG. 4 to rotate the transfer bars 42 to in turn move the support fingers 44 to positions spaced outwardly of the opposite ends of the workpieces 14. The transfer bars 42 can then be moved vertically with the fingers 44 in a clearance relation with the workpieces 14. When the bars 62 are moved to the left as viewed in FIG. 4, the fingers 44 will be moved to positions underneath a workpiece 14.

A pair of cylinder assemblies 70 and 72 are provided for moving the workpieces at the top and bottom ends, respectively, of the lines of stations A–E, inclusive, to the right so as to move these workpieces into the next successive line of stations. The cylinder assembly 70 is mounted on the frame 41 and connected to shafts 74 (FIG. 3) which extend horizontally of the apparatus 10 above the banks 16 and 18. Each shaft 74 carries a plurality of depending fingers 76 which are engageable with workpieces 14 in the lines A, C and E and also with three workpieces 14 supported on a shelf 78 which extends horizontally between the upper ends of the lines C and D. On movement of the shafts 74 to the right, as viewed in FIG. 1, by the cylinder assembly 70, workpieces engaged by the fingers 76 are moved horizontally a distance corresponding to the distance between adjacent lines A–B, for example. The workpieces 14 on the shelf 78 are spaced apart distances corresponding to this distance. In order to return the fingers 76 to their original positions, without affecting the positions of the workpieces 14 moved thereby, the shafts 74 are first rotated by actuation of a cylinder assembly 80 (FIG. 3) connected to a rod 82 which is in turn pivotally connected to the upper ends of links 84 splined on the shafts 74. On movement of the rod 82 to the right, as viewed in FIG. 3, the fingers 76 are moved to their broken line positions illustrated in FIG. 3 in which they are above workpieces 14 at the upper ends of the lines A–F, inclusive. Thus, the fingers can be returned without contacting the workpieces 14.

The lower cylinder assembly 72 is similarly mounted on frame 41 and connected to a pair of actuating rods 86 provided with upwardly extending fingers 88 engageable with the workpieces 14 at the bottom ends of the lines B and D. Links 90, splined on the bars 86, are pivotally connected to a transversely extending rod 92 movable by the cylinder assembly 94. On movement of the rod 92 to the right as viewed in FIG. 3 by the cylinder assembly 94, the fingers 88 are rotated to dotted line positions in which they are below the workpieces 14, so that the cylinder assembly 72 can be operated to return the fingers 88 to positions behind other workpieces 14. The assembly 94 can then be actuated to return the fingers 88 to upwardly extending positions illustrated in solid lines in FIG. 3.

Figure 5:
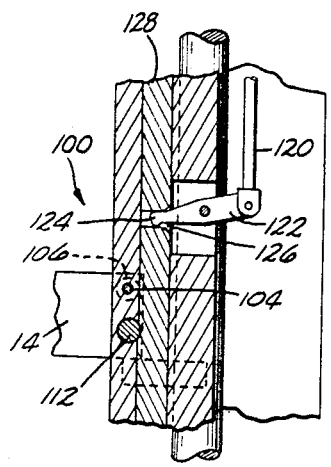
FIGURE 5 is an enlarged fragmentary sectional view of a portion of the apparatus of this invention, showing a detail of the workpiece clamping mechanism.
Figure 6:
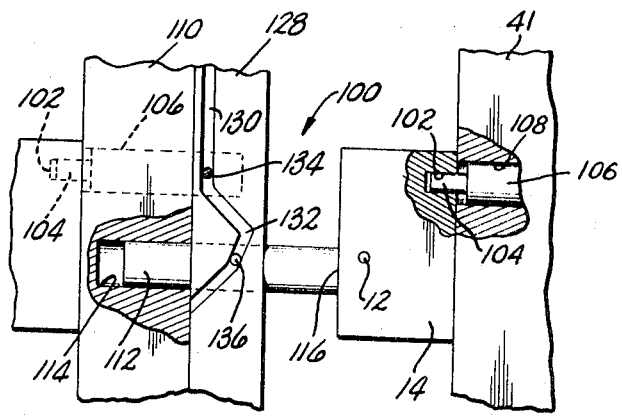
FIGURE 6 is another fragmentary detail view of a portion of the workpiece clamping mechanism.

When a workpiece 14 has been moved to a desired station, it is clamped in a fixed position on the frame 41 by any suitable means such as the pin and clamp assembly indicated generally at 100 in FIGS. 5 and 6. Each of the workpieces 14 is provided with special locating holes 102 which are adapted to be aligned with locating pins 104 which form part of the assembly 100 and are formed integral with the ends of silde cylinders 106 slidably mounted in openings 108 in the frame 41. Mounted in the frame 41 at a position below each slide cylinder 106 is a clamp bar 112. Each bar 112 is slidably mounted in an opening 114 in the frame member 110 for movement horizontally into abutting engagement with a flat surface 116 on the workpiece 14. For each workpiece 14, two locating pins 104 and two clamp bars 112 are provided, tlthough only one of each is illustrated in FIGS. 5 and 6 since they operate identically. A workpiece is clamped as shown in FIG. 6 against the frame 41 by moving a pair of locating pins 104 in one direction into the openings 102 in one side of the workpiece 14 and moving a pair of clamping bars 112 in the opposite direction against surfaces 116 on the opposite side of the workpiece 14.

The locating pins 104 and the clamp bars 112 are moved by a cylinder assembly 118 mounted on the frame 41 and connected by a rotatable shaft 119 to slide bars 121 provided with cam slots 123. Upright rods 120 have transverse pins 125 disposed in the slots so that reciprocation of slide bars 121 is effective to move the rods 120 up and down. The rods 120 are pivotally connected to levers 122, only one of which is shown, which are pivotally supported intermediate their ends on the frame 41 and have their opposite ends 124 positioned in slots 126 in a slide member 128. The member 128 is formed and an upright slot 130 having cam portions 132 of irregular shape. A transversely extending pin 134 on each cylinder 106 is disposed in the slot portion 132 and a similar pin 136 in each of the clamp bars 112 is also disposed in the slot portion 132. As a result, on movement of the member 128 upwardly from the position shown in FIG. 6, the pin 134 is moved into the slot portion 132 so as to retract the locating pin 104. At the same time, the pin 136 is moved in the cam portion 132 so as to move the clamp bar 112 away from the workpiece 14. It can thus be seen that when the cylinder assembly 118 is operated to move the members 128 downwardly, the locating pins 104 and the clamp bars 112 are moved into positions in which they hold a workpiece 14 at a station in a fixed position. When the cylinder assembly 118 is reversely operated to move the members 128 upwardly, the locating pins 104 and the clamp bars 112 are retracted so that the workpieces 14 at the stations are released and can be moved vertically in the lines A–F, inclusive.

It is to be noted that the drills 20 for the bank 16 are located only at the stations at which the workpieces numbered 3–6, 9–12, and 15–18 are located in the FIG. 8 condition of the apparatus 10. The drills 20 for the bank 18 are located only at the stations at which the workpieces numbered 24–27, 30–33, and 36–39 are located in FIG. 8. The clamping assemblies 100 are positioned only at these stations, which are hereinafter referred to as the "work stations."

In the operation of the apparatus 10, assume that machining operations have been completed, the bodies 30 on which the drills are mounted have been retracted so that the drills 20 are in clearance relation with the workpieces 14, the horizontal transfer bars 74 and 86 have been rotated to move the horizontal transfer fingers 76 and 88 to the broken line positions illustrated in FIG. 3 in which they are also in a clearance relation with the workpieces 14, and that the numbered workpieces are in the positions shown in FIG. 8. The cylinder assembly 46 is actuated to thereby move the workpieces in lines A, C and E upwardly a distance corresponding to the distance between adjacent stations, and move the workpieces in lines B, D and F downwardly a similar distance. As shown in FIG. 1, there are no workpieces at the top ends of lines A, C and E prior to such movement, and also no workpieces at the bottom ends of lines B, D and F, so that there are no workpieces in positions to interfere with this vertical movement.

While the vertical transfer bars 42 are being moved to move the workpieces up and down in the lines A–F, inclusive, the cylinder assemblies 70 and 72 are operated to move the horizontal transfer bars 74 and 86 to the left (FIG. 1). The cylinder assemblies 80 and 94 are then actuated so that the fingers 76 and 88 are in position to engage the workpieces at the top and bottom ends of the lines. The cylinder assembly 118 is then actuated so as to move the locating pins 104 and the clamps 112 into positions holding the workpieces at the twenty-four work stations. The numbered workpieces are now in the positions shown in FIG. 9.

The drill bank bodies 30 are now moved on the bases 32 toward the workpieces 14 so as to drill the holes therein. During drilling of the workpieces 14 by the drills 20, the cylinder assemblies 70 and 72 are operated to advance the workpieces numbered 6, 18, 20, 21, 22 and 33 in FIG. 9 to the right at the top ends of the lines and move the workpieces numbered 12 and 27 to the right at the bottom ends of the lines, to thereby move the workpiece 6 out of the line A and into the line B, the workpiece 12 out of the line B and into the line C, the workpiece 27 out of line D and into line E, the workpiece 33 out of the line E and into the line F and advance the workpieces 20, 21 and 22 on the shelf 78 one station so that the workpiece 22 is in the line D, and move the workpiece 18 onto the shelf 78. Just prior to actuation of cylinder assemblies 70 and 72, slide supports 155, which are at other times retracted into shelf 78, are extended by an actuating motor 157 into a supporting relation with the workpieces 6, 18, 22, and 33 during horizontal transfer. The supports 155 are then retracted so as not to interfere with subsequent vertical transfer.

The parts are now in the positions shown in FIG. 10. During horizontal transfer, the cylinder 64 is actuated to move the vertical transfer fingers 44 out of a supporting relation with the workpieces 14, and the transfer cylinder 46 is reversely actuated to return the vertical transfer bars to their original positions, following which the cylinder 64 is reversely actuated to again position the fingers 44 in a supporting relation with the workpieces in the positions shown in FIG. 10. The completed workpiece 39 can be unloaded at the same time.

The above sequence is then repeated commencing with actuation of the cylinder assembly 46 to move the vertical transfer bars 42, during which time the horizontal transfer bars 74 and 86 are returned.

A workpiece, corresponding to the workpiece numbered 2 in FIG. 8, can be loaded into the apparatus 10 at the same time that a workpiece is unloaded, automatic load and unload apparatus being indicated at 150 and 152 in FIG. 2 to indicate the direction from which the parts are loaded and unloaded.

Part service and access areas are obtained in the areas indicated at 154 in FIG. 2 by virtue of the arrangement of the banks 16 and 18. In these areas, workpieces 14 which are not at the work stations can be removed for examination and testing. Eight such stations are provided at the top and bottom ends of the lines A–F, inclusive, and the three stations on the shelf 78 are also useful for this purpose.

From the above description it is seen that this invention provides machine tool apparatus 10 which has a total of twenty-four work stations, one load station, one unload station, eight stations where parts can be removed and examined, and five stranfer stations, namely, stations where workpieces are resident only during transfer, with a minimum of floor space requirements because the lines A–F extend vertically. As a result, a workpiece is unloaded from the apparatus 10 following the completion of each drilling operation, and since twenty-four work stations are involved, twenty-four drill passes are made to form the hole 12, so that only a short hole is drilled with each drill 20. Consequently, all of the drills 20 can be operated at slow speed to extend the life of the drills 20. In addition, the apparatus 10 is relatively simple to install and maintain because of the uniformity of the drill banks 16 and 18.

It will be understood that the machine tool apparatus which is herein disclosed and described is presented for purposes of explanation and illustration and is not intended to indicate limits of the invention, the scope of which is defined by the following claims.

What is claimed is:

1. Machine tool apparatus comprising means providing a plurality of successive stations arranged in a plurality of spaced vertically extending lines, means for moving a plurality of workpieces in each of said lines vertically to successive stations so that the workpieces in adjacent lines move in opposite directions, said means comprising vertically movable transfer bars, transfer fingers on said bars, and means for rotating said bars between a first position in which said fingers are below and in a supporting relation with said workpieces and a second position in which said fingers are to one side of and in a clearance relation with said workpieces, means for subsequently moving the workpieces at the tops of the lines which have been moved upwardly and the bottoms of the lines which have been moved downwardly in one direction substantially horizontally to a position in the next successive line, means for holding moved workpieces in fixed positions at some of said stations, and tool means for performing a particular machining operation at at least some of said stations at which workpieces are held in fixed positions.

2. Apparatus according to claim 1 in which said means for moving the workpieces at the tops and bottoms of said lines comprises horizontal transfer bars, vertically extending means on said transfer bars positioned adjacent said workpieces, and means for rotating said horizontal transfer bars between a first position in which said fingers are engageable with said workpieces on axial movement of said horizontal transfer bars and a second position in which said fingers are in a clearance relation with said workpieces so that they will not engage the workpieces on axial movement of said horizontal transfer bars.

References Cited

UNITED STATES PATENTS

| 1,736,891 | 11/1929 | Thompson | 198—136 |
| 2,890,468 | 6/1959 | Arnold et al. | 10—2 |
| 176,116 | 4/1876 | Young | 77—21 |
| 1,901,598 | 3/1933 | Herzog | 144—309 |

OTHER REFERENCES

Publication: The Machinist, Jan. 14, 1955, article entitled "Pontiac Automated Cylinder-Block Lines," pp. 62 and 63, and article entitled "Chrysler V-8 Engine Block," pp. 72 and 73.

FRANCIS S. HUSAR, *Primary Examiner.*

U.S. Cl. X.R.

77—5, 21